(12) United States Patent
Akatsuka et al.

(10) Patent No.: US 8,915,161 B2
(45) Date of Patent: Dec. 23, 2014

(54) FINE MOTION CONTROL ROD DRIVE MECHANISM HANDLING APPARATUS AND METHOD OF HANDLING FINE MOTION CONTROL ROD DRIVE MECHANISM

(75) Inventors: Hirokazu Akatsuka, Hitachi (JP); Toshihiro Kodama, Hitachi (JP); Takeaki Suzuki, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 506 days.

(21) Appl. No.: 13/030,486

(22) Filed: Feb. 18, 2011

(65) Prior Publication Data

US 2011/0239797 A1    Oct. 6, 2011

(30) Foreign Application Priority Data

Mar. 31, 2010   (JP) ................. 2010-080068

(51) Int. Cl.
*F16H 1/04*   (2006.01)
*G21C 7/14*   (2006.01)

(52) U.S. Cl.
CPC ........ *G21C 7/14* (2013.01); *F16D 2500/10462* (2013.01); *F16D 2500/50607* (2013.01); *Y02E 30/39* (2013.01)
USPC ..... 74/339; 376/228; 376/233; 976/DIG. 125

(58) Field of Classification Search
CPC .......... Y02E 30/39; G21C 7/12; G21C 19/02; G21C 19/20; G21C 7/14
USPC ........................... 74/395, 325, 392, 352, 335; 475/149–157; 376/219, 228, 232, 233, 376/450, 242, 353, 260; 976/DIG. 119, 976/DIG. 125, DIG. 126, DIG. 128
See application file for complete search history.

(56) References Cited

U.S. PATENT DOCUMENTS

| | | | | |
|---|---|---|---|---|
| 3,089,839 | A | * | 5/1963 | Liederbach et al. .......... 376/233 |
| 3,492,616 | A | * | 1/1970 | Thayer et al. .................... 336/30 |
| 3,720,580 | A | * | 3/1973 | Schabert et al. ............... 376/223 |
| 4,053,355 | A | * | 10/1977 | Vuckovich ..................... 376/258 |
| 4,158,600 | A | * | 6/1979 | Akimoto et al. ............... 376/260 |
| 4,292,133 | A | * | 9/1981 | Sasaki et al. ................... 376/260 |
| 4,696,786 | A | * | 9/1987 | Frizot et al. .................... 376/245 |
| 4,713,212 | A | * | 12/1987 | Plumier ......................... 376/258 |
| 4,894,849 | A | * | 1/1990 | Rohosky et al. ............... 376/268 |

(Continued)

FOREIGN PATENT DOCUMENTS

| | | |
|---|---|---|
| JP | 3-211495 | 9/1991 |
| JP | 9-209004 | 8/1997 |

(Continued)

*Primary Examiner* — Troy Chambers
*Assistant Examiner* — Valentin Craciun
(74) *Attorney, Agent, or Firm* — Antonelli, Terry, Stout & Kraus, LLP.

(57) ABSTRACT

A fine motion control rod drive mechanism handling apparatus attaches a fine motion control rod drive mechanism having a control rod drive mechanism body, a spool piece, a motor bracket and a motor unit to a reactor pressure vessel, and detaches it from the reactor pressure vessel. The fine motion control rod drive mechanism handling apparatus is provided with a bolt wrench assembly, a motor unit attachment mounted to the bolt wrench assembly, for meshing a first gear of a first gear coupling on a spool piece side with a second gear of a second gear coupling on a motor unit side, and a rotation mechanism mounted to the bolt wrench assembly, for rotating the motor unit attachment.

5 Claims, 10 Drawing Sheets

(56) References Cited

U.S. PATENT DOCUMENTS

| | | | |
|---|---|---|---|
| 4,966,747 A * | 10/1990 | Tower et al. | 376/254 |
| 5,331,675 A * | 7/1994 | Hosoya et al. | 376/260 |
| 5,570,399 A * | 10/1996 | Sakamaki | 376/260 |
| 5,581,587 A * | 12/1996 | Satoh et al. | 376/230 |
| 5,793,826 A * | 8/1998 | Sato et al. | 376/228 |

FOREIGN PATENT DOCUMENTS

| | | | | |
|---|---|---|---|---|
| JP | 2000-329892 | | 11/2000 | |
| JP | 2000329892 A | * | 11/2000 | G21C 19/20 |
| JP | 2001-159698 | | 6/2001 | |
| JP | 2003165023 A | * | 6/2003 | B23F 5/04 |

* cited by examiner

FINE MOTION CONTROL ROD DRIVE MECHANISM HANDLING APPARATUS AND METHOD OF HANDLING FINE MOTION CONTROL ROD DRIVE MECHANISM

CLAIM OF PRIORITY

The present application claims priority from Japanese Patent application serial no. 2010-80068, filed on Mar. 31, 2010, the content of which is hereby incorporated by reference into this application.

BACKGROUND OF THE INVENTION

1. Technical Field

The present invention relates to a fine motion control rod drive mechanism handling apparatus and a method of handling a fine motion control rod drive mechanism for attaching and detaching a fine motion control rod drive mechanism.

2. Background Art

A fine motion control rod drive mechanism is provided with four kinds of components of a control rod drive mechanism body, a spool piece, a motor bracket, and a motor unit. The fine motion control rod drive mechanism is attached to and detached from control rod drive mechanism housings installed side by side crosswise at a pitch of about 300 mm at the bottom of a reactor pressure vessel by a fine motion control rod drive mechanism handling apparatus.

In Japanese Patent Laid-open No. 2000-329892, an attaching and detaching attachment of the motor unit being used in the fine motion control rod drive mechanism is described. The motor unit attachment for fitting phase of a flange of the motor unit to phase of a flange of a motor bracket and for executing fine adjustment of the attaching position of the motor unit by using a rotational position adjusting means when attaching the motor unit is described.

CITATION LIST

Patent Literature

Patent literature 1: Japanese Patent Laid-open No. 2000-329892

SUMMARY OF THE INVENTION

Technical Problem

However, in the prior art described in Japanese Patent Laid-open No. 2000-329892, there exists the following problem. Conventionally, when attaching the motor unit to the motor bracket, it is necessary to mesh outer teeth of a gear coupling on the motor unit side with inner teeth of a gear coupling on the spool piece side in the tip-root position of the gear. When the gear coupling on the motor unit side is not meshed with the gear coupling on the spool piece side in the tip-root position phase of the gear, the leading edge faces of the gear couplings make contact with each other, thereby not meshing with each other, thus a bolt wrench assembly of the fine motion control rod drive mechanism handling apparatus cannot ascend and the motor unit cannot be attached to the motor bracket. Therefore, it becomes necessary to descend the bolt wrench assembly, adjust a rotational position at the tip-root position of the gear of the gear coupling on the motor unit side by visually confirming the tip-root position of the gear of the motor unit so as to mesh with the tip-root position of the gear of the gear coupling on the spool piece side, ascend the bolt wrench assembly again, and repeatedly execute the attaching operation of the motor unit to the motor bracket.

An object of the present invention is to provide a fine motion control rod drive mechanism handling apparatus and a method of handling a fine motion control rod drive mechanism capable of improving operability for attaching a motor unit and of shortening the attaching operation time.

Solution to Problem

The present invention for accomplishing the above object is characterized in that in a fine motion control rod drive mechanism handling apparatus provided with a motor unit attachment for attaching a motor unit of a fine motion control rod drive mechanism to a motor bracket, the fine motion control rod drive mechanism handling apparatus has a rotational mechanism for rotating the motor unit and a spring mechanism for pressing the motor unit to the bracket.

Advantageous Effect of the Invention

According to the present invention, the attaching operation time of the motor unit can be shortened.

BRIEF DESCRIPTION OF THE DRAWINGS

FIGS. 7(*a*) and 7(*b*) is are explanatory drawings, showing gear coupling shapes of a spool piece of a fine motion control rod drive mechanism in FIG. 7(*a*), and of a motor unit in FIG. 7(*b*).

DETAILED DESCRIPTION OF THE PREFERRED EMBODIMENTS

Hereinafter, each embodiment will be explained with reference to drawings.

[Embodiment 1]

(Explanation of the Fine Motion Control Rod Drive Mechanism)

Figure 4:
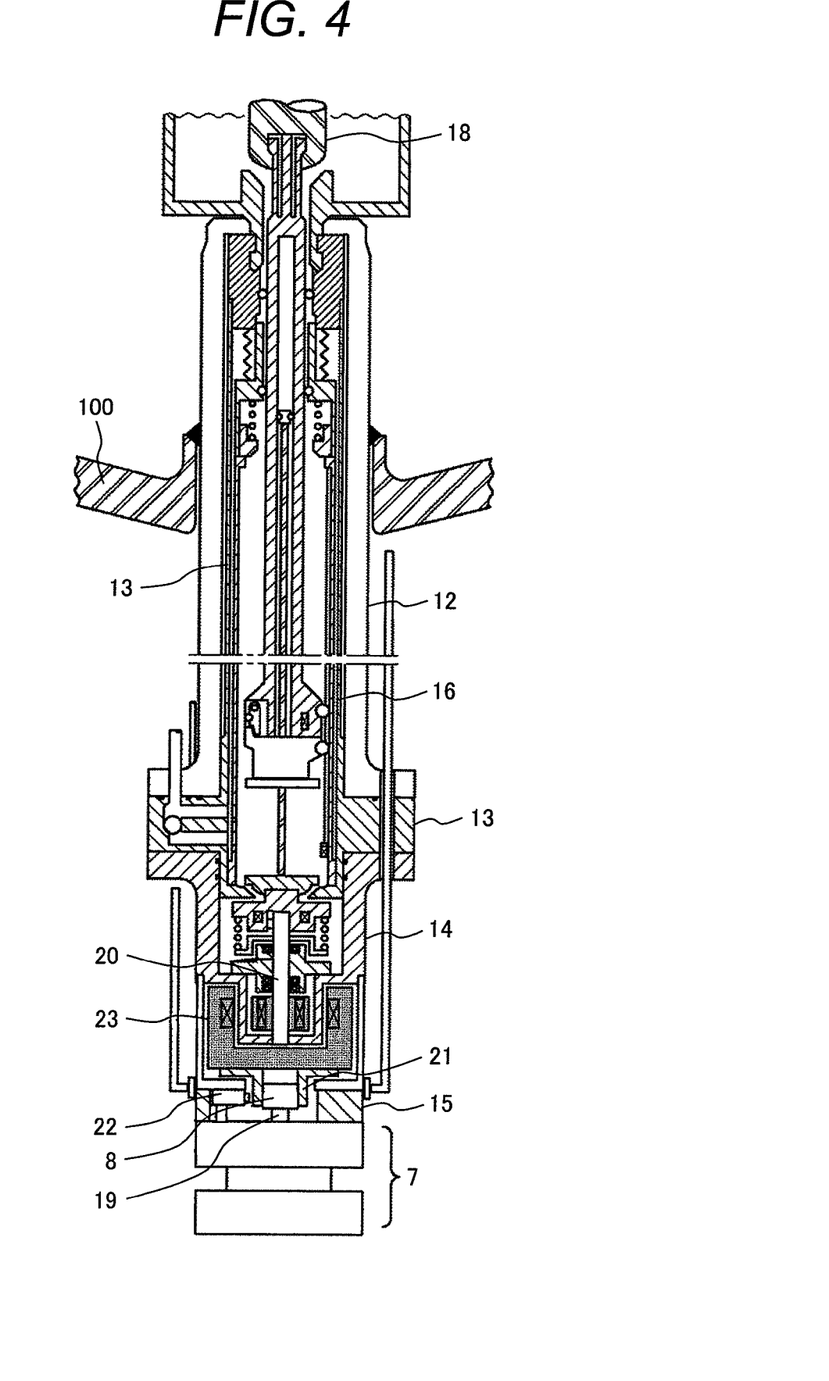
FIG. 4 is a longitudinal sectional view showing a fine motion control rod drive mechanism.

FIG. 4 is a longitudinal sectional view showing an overall schematic structure of a fine motion control rod drive mechanism 16 to which a fine motion control rod drive mechanism handling apparatus is applied. In FIG. 4, the fine motion control rod drive mechanism 16 is provided with a control rod drive mechanism body 13 having a mechanism for moving up and down a control rod 18 disposed in a reactor pressure vessel 100 and a rotary shaft 20, a spool piece 14 having a magnet coupling 23 for transmitting the turning force by magnetic force via the pressure resistant portion joined to the rotary shaft 20, a motor unit 7 having a built-in motor as a drive source, and a motor bracket 15 for connecting the motor unit 7 and spool piece 14. The control rod drive mechanism body 13 is disposed in a control rod drive mechanism housing 12 connected to a bottom head portion of the reactor pressure vessel 100.

Figure 2:
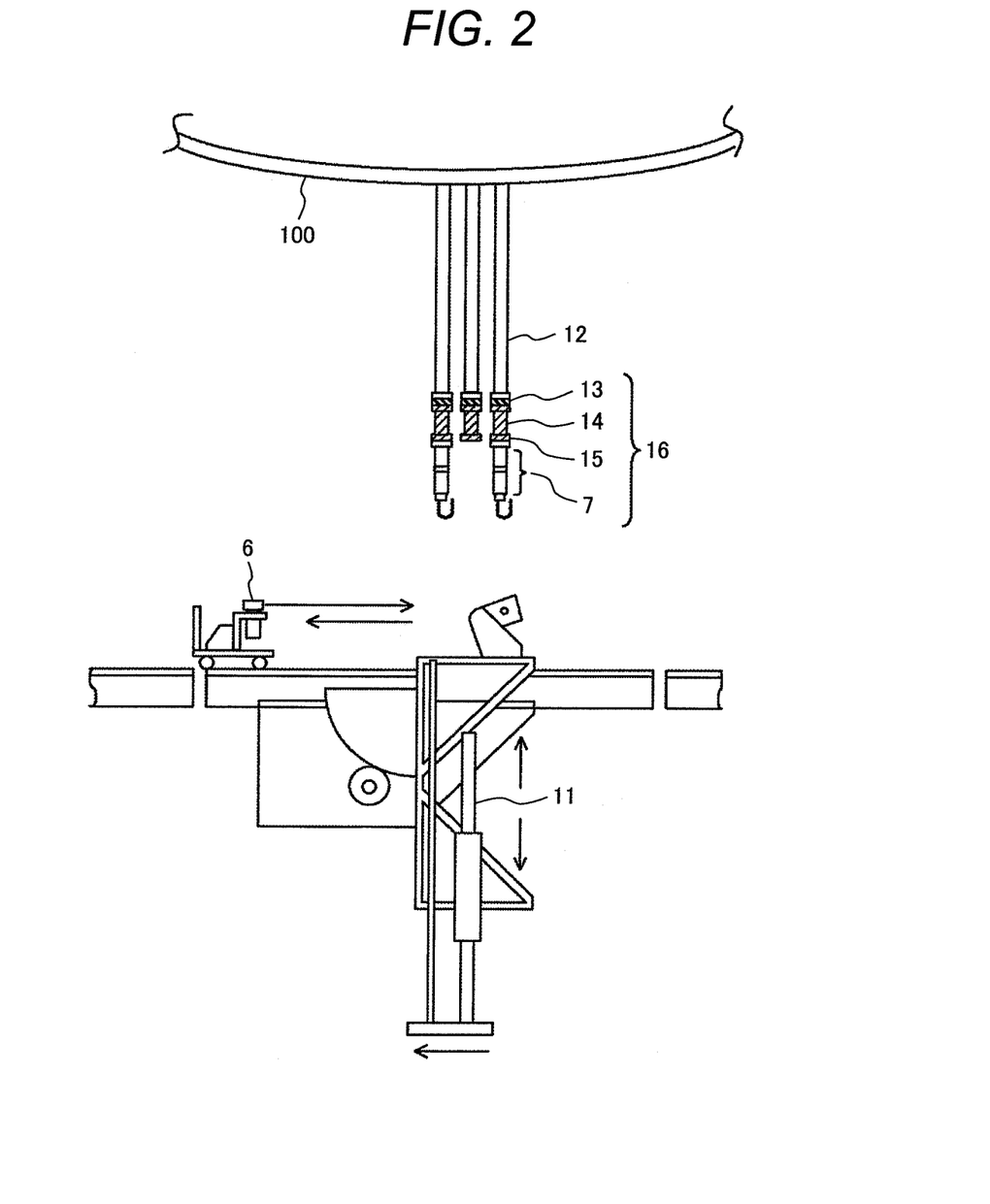
FIG. 2 is an explanatory drawing showing a preparation state of operation for attaching a motor unit by using a fine motion control rod drive mechanism handling apparatus.

FIG. 2 is an explanatory drawing showing a preparation state of operation for attaching a motor unit by using a fine motion control rod drive mechanism handling apparatus. The fine motion control rod drive mechanism 16 has four kinds of components of the control rod drive mechanism body 13, spool piece 14, motor bracket 15, and motor unit 7. The components thereof are each attached to and detached from the control rod drive mechanism housings installed side by side crosswise at a pitch of about 300 mm at the bottom head portion of the reactor pressure vessel by using the fine motion control rod drive mechanism handling apparatus. The fine motion control rod drive mechanism handling apparatus has four kinds of attachments of a control rod drive mechanism body attachment, a spool piece attachment, a motor bracket attachment, and a motor unit attachment in correspondence with the four kinds of components composing the fine motion control rod drive mechanism 16. The attachment attached to a head portion of the bolt wrench assembly 11 of the fine motion control rod drive mechanism handling apparatus is changed one of the above four attachment depending on the target component of the fine motion control rod drive mechanism for executing attaching and detaching, thus each device can be attached and detached.

Figure 3:
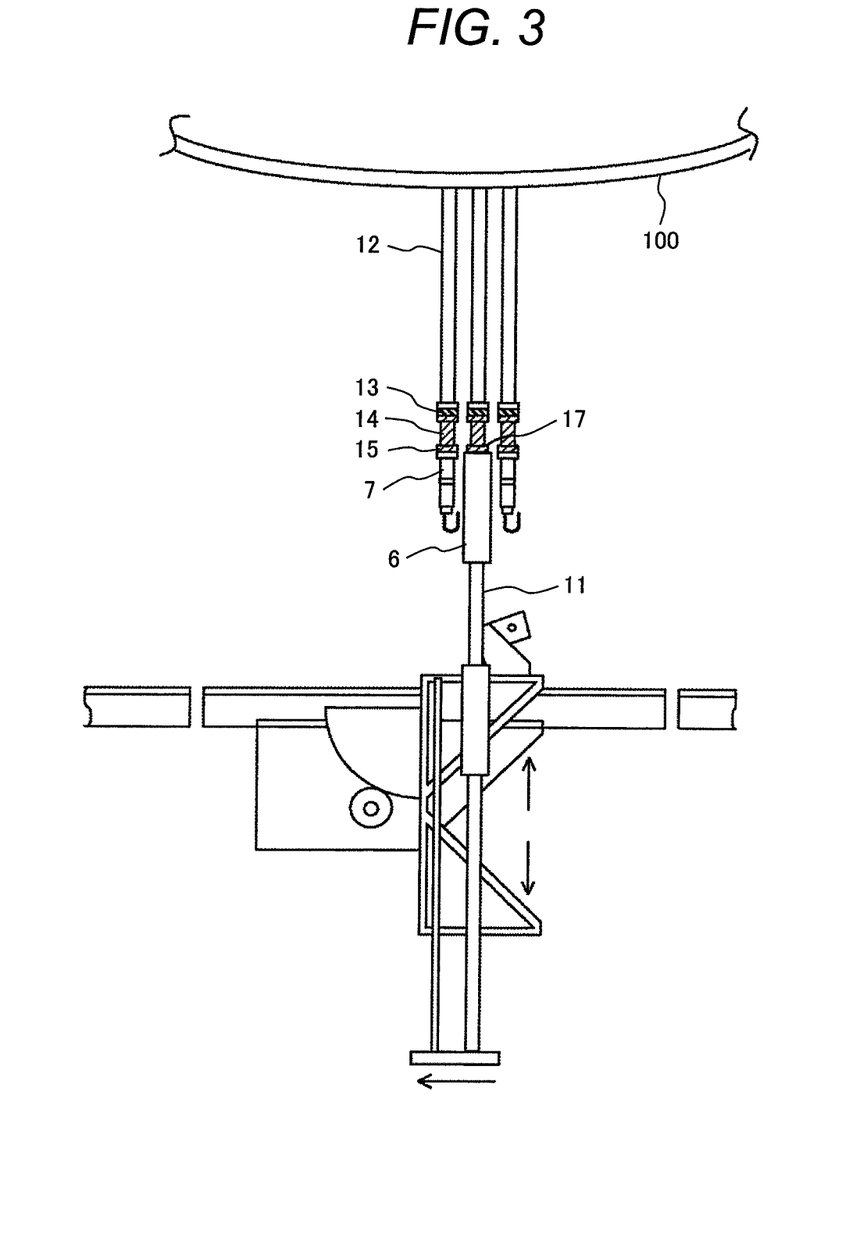
FIG. 3 is an explanatory drawing showing operation for attaching a motor unit, using a fine motion control rod drive mechanism handling apparatus.

FIG. 3 is an explanatory drawing showing operation for attaching a motor unit, using a fine motion control rod drive mechanism handling apparatus. A motor unit attachment 6 is attached to the attachment of the head portion of the bolt wrench assembly 11. The bolt wrench assembly 11 is ascended by the fine motion control rod drive mechanism handling apparatus, and then the motor unit 7 is attached to the motor bracket 15 with an attaching bolt 17.

Further, the fine motion control rod drive mechanism 16, in which the control rod drive mechanism body 13, spool piece 14, motor bracket 15, and motor unit 7 are each bolt-joined, is provided with a rotary shafts 19 and 20. The rotary shaft 19 transmits drive force from the motor unit which is a rotation drive source to the magnet coupling 23 via a gear coupling 8 on the motor unit side and a gear coupling 21 on the spool piece side. The rotary shaft 20 transmits the drive force from the magnet coupling 23 to the mechanism for driving the control rod so as to ascend in the pressure partition. To hold the control rod, the brake in the motor unit 7 is used. When the motor unit 7 is removed from the motor bracket 15, the rotary shaft 20 rotates in a withdrawal direction of the control rod 18. To prevent rotation of the rotary shaft 20 and gear coupling 21 of the spool piece 14, a rotation stopping mechanism (not shown) is installed in the spool piece 14. Also in the motor bracket 15, a rotation stopping mechanism 22 is installed.

(Explanation of the Motor Unit Attachment)

Figure 1:
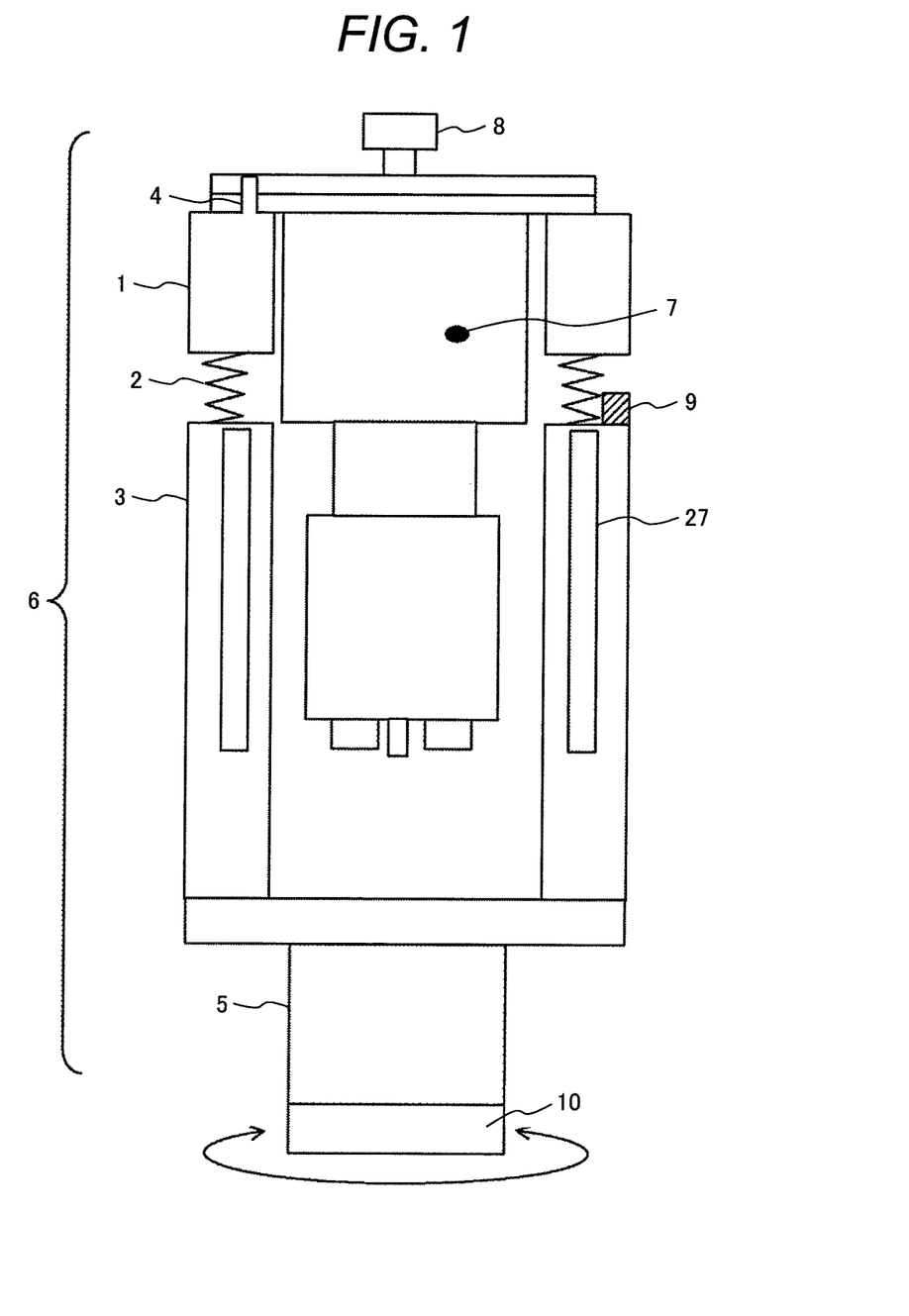
FIG. 1 is a longitudinal sectional view showing a fine motion control rod drive mechanism handling apparatus according to embodiment 1, which is a preferred embodiment of the present invention.

FIG. 1 is a longitudinal sectional view showing a fine motion control rod drive mechanism handling apparatus according to present embodiment and shows a state that the motor unit 7 is put on the motor unit attachment 6 of the fine motion control rod drive mechanism handling apparatus. In FIG. 1, the motor unit attachment 6 has mainly a bracket 1 for putting the motor unit 7 on, a spring mechanism 2 (an elasticity portion) as an elasticity member for relieving the load when the bracket 1 is pressed, a casing 3 for supporting an entire device including the motor unit 7, and a shaft 5 having a connection portion connected to the bolt wrench assembly 11. The bracket 1 of the motor unit attachment 6 includes a bolt wrench 27 for tightening an attaching bolt 17 for attaching the motor unit 7 to the motor bracket 15 and a positioning pin 4 for positioning the motor unit 7 in the rotational direction. Further, the motor unit attachment 6 operates in accordance with the operation of the bolt wrench assembly 11 of the fine motion control rod drive mechanism handling apparatus that rotates at a specified angle. In addition, the motor unit attachment 6 has a load meter 10 for measuring the load and a limit switch 9 for detecting the movement limit.

(Explanation of the Motor Unit Attaching Operation of the Fine Motion Control Rod Drive Mechanism)

Next, the operation of attaching the motor unit 7 of the fine motion control rod drive mechanism 16 will be explained.

As shown in FIG. 2, the motor unit attachment 6 is attached to the bolt wrench assembly 11 at the head portion of the fine motion control rod drive mechanism handling apparatus. The bolt wrench assembly 11 where the motor unit attachment 6 is already attached is positioned to a position for attaching the motor unit 7. After positioning, the motor unit 7 being an attaching object is put on the motor unit attachment 6 attached to the bolt wrench assembly 11.

As shown in FIG. 3, the bolt wrench assembly 11 is ascended and the motor unit 7 is mounted to the motor bracket 15 attached to the spool piece 14 fixed to the control rod drive mechanism housing 12, by the bolt wrench assembly 11. When the bolt wrench assembly 11 ascends, the outer teeth of the gear coupling 8 of the motor unit 7 and the inner teeth of the gear coupling 21 of the spool piece 14 mesh with each other, and the bolt wrench assembly 11 ascends straight, thus the motor unit 7 is pressed in, and the motor unit 7 is mounted to the motor bracket 15. After mounting the motor unit 7, the attaching bolt 17 of the motor unit 7 is tightened by the bolt wrench 27 of the motor unit attachment 6, and the motor unit 7 is attached to the motor bracket 15. After attaching the motor unit 7, if the bolt wrench assembly 11 with the motor unit attachment 6 attached to it is descended, the motor unit 7 and the motor unit attachment 6 are separated from each other. Furthermore, the bolt wrench assembly 11 is descended, and the motor unit attachment 6 is detached from the bolt wrench assembly 11, thus the attaching operation of the motor unit 7 is finished.

(Explanation of the Motor Unit Detaching Operation of the Fine Motion Control Rod Drive Mechanism)

Next, the operation of detaching the motor unit 7 of the fine motion control rod drive mechanism 16 will be explained. The position of the bolt wrench assembly 11 of the fine motion control rod drive mechanism handling apparatus is positioned to the motor unit a position of the motor unit 11 being a detaching object mounted to the motor bracket 15.

The motor unit attachment 6 is attached to the bolt wrench assembly 11, and the bolt wrench assembly 11 with the motor unit attachment 6 attached to it is ascended, and the motor unit attachment 6 is mounted to the motor unit 7 to be detached. After mounting the motor unit attachment 6, the attaching bolt 17 of the motor unit 7 is loosened by the bolt wrench 27 of the motor unit attachment 6, and the motor unit 7 is detached from the motor bracket 15. The detached motor unit 7 is put on the top of the motor unit attachment 7 and if the bolt wrench assembly 11 is descended, it is separated from the motor bracket. The bolt wrench assembly 11 is descended furthermore, and the motor unit 7 is taken out from the motor unit attachment 6. The motor unit attachment 6 is detached from the bolt wrench assembly 11, thus the motor unit detaching operation is finished.

Figure 5:
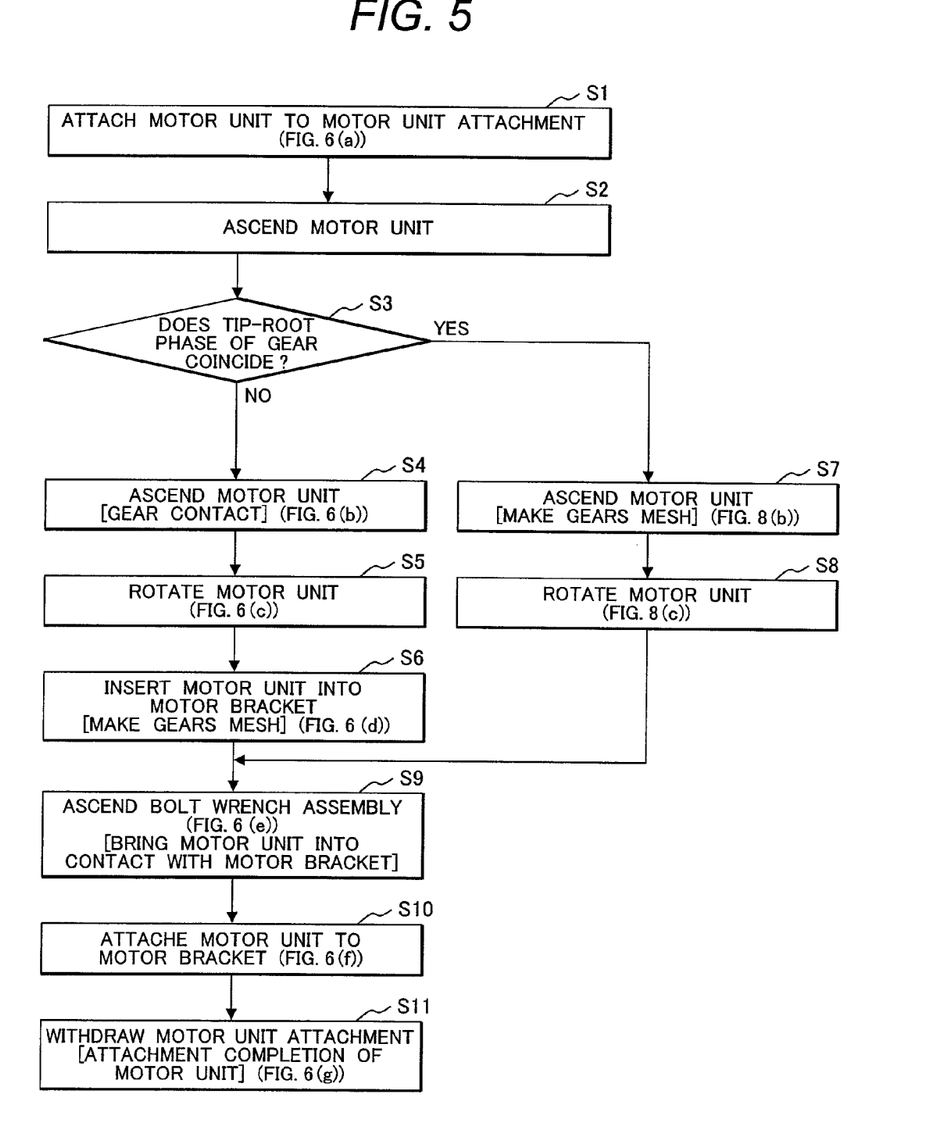
FIG. 5 is a flowchart showing operation procedure for attaching a motor unit by using a fine motion control rod drive mechanism handling apparatus.
Figure 6:
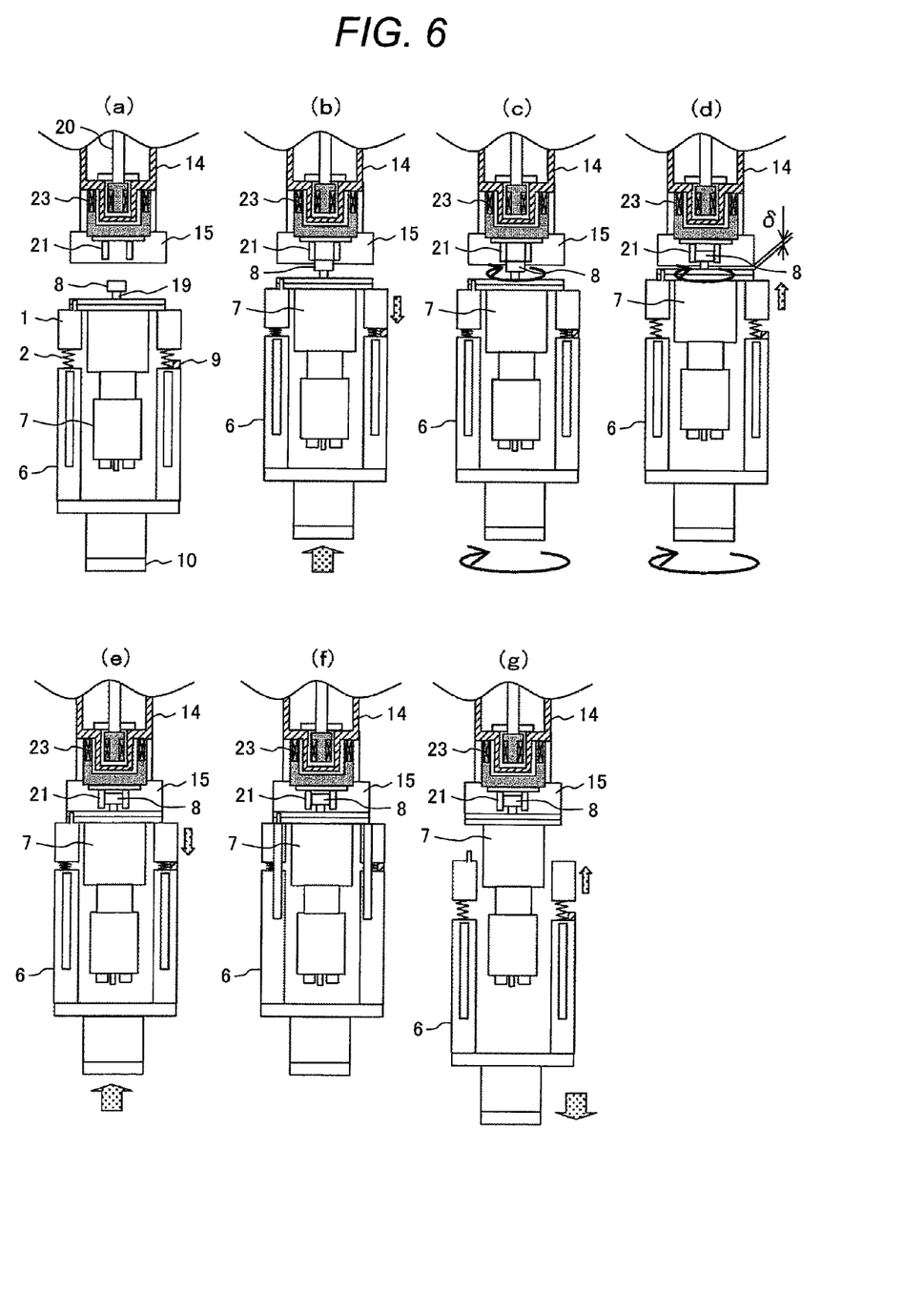
FIG. 6 is an explanatory drawing showing a method for attaching a motor unit in a method of handling a fine motion control rod drive mechanism of embodiment 1 when gears do not mesh with each other in each operation procedure for attaching the motor unit by using a fine motion control rod drive mechanism handling apparatus.

A method for attaching the motor unit 7 in the embodiment 1 by using the fine motion control rod drive mechanism handling apparatus will be explained with reference to FIGS. 5 and 6. FIG. 5 shows a flowchart of operation procedure for attaching a motor unit 7 and FIG. 6 shows specific contents of processes shown in FIG. 5. A case that the gear coupling 8 on the motor unit side shown in FIG. 5 and the gear coupling 21 on the spool piece side do not coincide with each other in the tip-root phase of the gear will be described below.

The motor unit 7 is attached to the motor unit attachment 6 (step S1). After that, the motor unit 7 is ascended (step S2). FIG. 6(a) shows a state where the motor unit attachment 6 is attached to the bolt wrench assembly 11 of the fine motion control rod drive mechanism handling apparatus, and the bolt wrench assembly 11 has been ascended with the motor unit attachment 6 on which the motor unit 7 is put. The ascent and descent is executed by a mechanism for ascending and descending the bolt wrench assembly 11 by a motor drive. The mechanism for ascending and descending the bolt wrench assembly 11 is attached to the fine motion control rod drive mechanism handling apparatus. The bolt wrench assembly 11 is positioned to the specified attaching position of the motor unit 7, and then the motor unit 7 is ascended. At this time, the motor unit attachment 6 and motor unit 7 are ascended in a state where they have been rotated by a specified angle on the axis relative to the bolt joint position to the motor bracket 15. In this rotation, the motor unit attachment 6 and motor unit 7 can be rotated by a rotational mechanism installed on the bolt wrench assembly 11. As an example of the rotational mechanism, a motor may be cited. Further, the motor unit 7 is attached in accordance with the positioning pin 4 in the rotational direction of the motor unit attachment 6, thus the position in the rotational direction is not changed.

Whether the tip-root phase of the gear of the gear coupling 8 on the motor unit side and the tip-root phase of the gear of the gear coupling 21 on the spool piece side coincide with each other or not is determined (step S3). When this determination is "YES", that is, these tip-root phases coincide with each other; operation of step S7 is executed. The operation of the steps S7 and S8 will be described later. When that determination is "No", that is, these tip-root phases do not coincide with each other; operation of step S4 is executed. The motor unit 7 is ascended (step S4). FIG. 6(b) shows a state that the motor unit attachment 6, and the bolt wrench assembly 11 with the motor unit 7 attached are ascended and end faces of the gear coupling 8 and the gear coupling 21 are in contact with each other.

Figure 7:
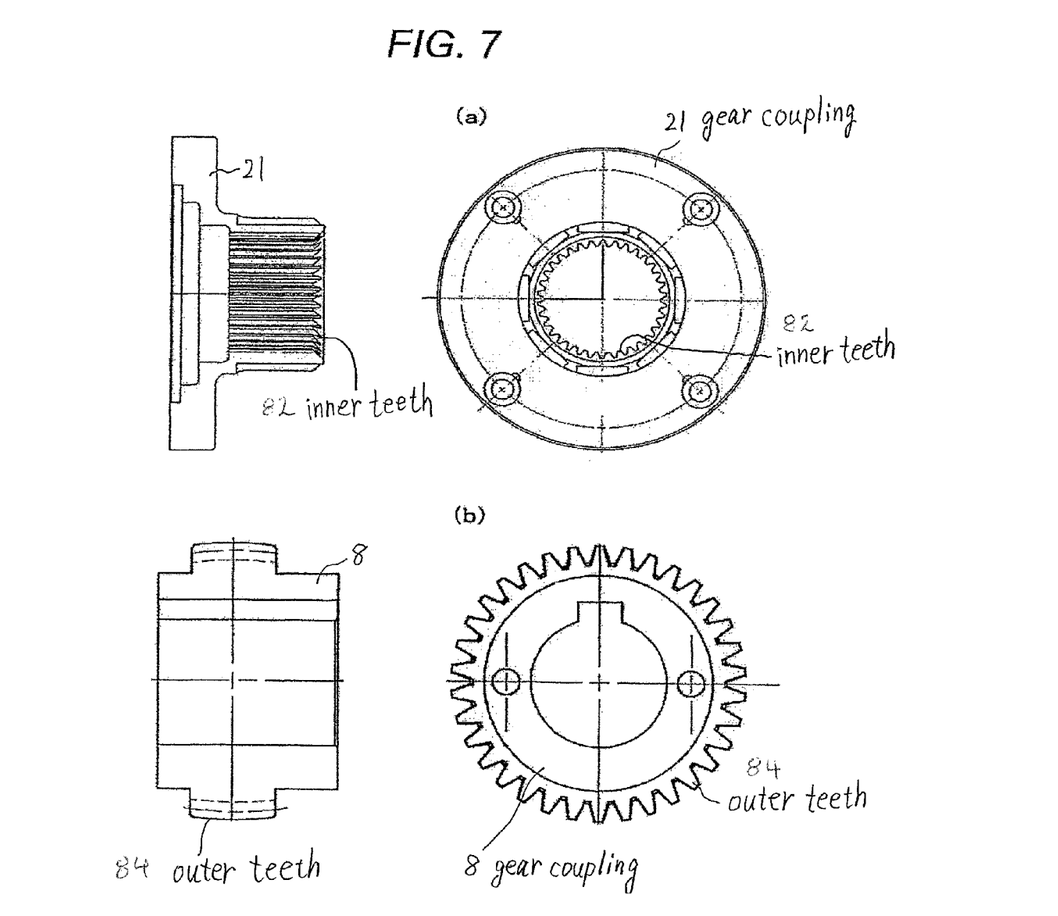

Outer teeth 84 of the gear coupling 8 on the motor unit side and inner teeth 82 of the gear coupling 21 on the spool piece side are shaped as shown in FIGS. 7(a) and 7(b). When the motor unit 7 ascends, if the outer teeth 84 of the gear coupling 8 on the motor unit side and the inner teeth 82 of the gear coupling 21 on the spool piece side do not mesh with each other in the tip-root position of the gear, a tip end of the gear coupling 8 on the motor unit side come into contact with an end face of the gear coupling 21 on the spool piece side. Further, when the outer teeth 84 and inner teeth 82 do not mesh with each other in the tip-root position of the gear, the tip-root positions of both gears may be detected based on the information from the sensor for detecting the respective rotational angles of the outer teeth 84 of the gear coupling 8 on the motor unit side and the inner teeth 82 of the gear coupling 21 on the spool piece side and the design data of the respective gears. And, the procedures shown in FIG. 6(c) and the subsequent drawings may be executed so as to phase-focus the shifted positions using the detected positions.

In a state that the end faces of the gear couplings come into contact with each other, the bolt wrench assembly 11 is ascended furthermore, so that to prevent the gear couplings from application of an excessive load, the spring mechanism 2 built in the motor bracket 15 of the motor unit attachment 6 is contracted. Consequently, in the motor unit attachment 6, a state that a pressing load is acted upward by the spring reaction force is kept. The gear coupling 8 on the motor unit side and internal parts can be prevented from damage because excessive load is not added to the gear couplings by the spring mechanism. Furthermore, the bolt wrench assembly 11 is ascended, so that the position of the motor unit 7 is not changed. However, the spring mechanism 2 is compressed. The movement amount of the bolt wrench assembly 11 is detected by the position detector installed in the bolt wrench assembly 11, and the bolt wrench assembly 11 is stopped at a preset position. The position detector measures the movement amount by the position detector for detecting the rotational angle of the motor on the side of the fine motion control rod drive mechanism handling apparatus. At this time, the ascending height of the bolt wrench assembly 11 should be such that the attaching faces of the motor unit 7 and motor bracket 15 are within the range free of contact with each other when the outer teeth of the gear coupling 8 on the motor unit side and the inner teeth of the gear coupling 21 on the spool piece side mesh with each other in the tip and root of the gear and the gear coupling 8 on the motor unit side is inserted in the gear coupling 21 on the spool piece side. One reason of setting the attaching faces of the motor unit 7 and motor bracket 15 within the range free of contact with each other is that if the motor unit 7 is lifted up beyond the range in which the motor unit 7 come into contact with the motor bracket 15, when the motor unit 7 is rotated by the next operation and the gears coincide with each other in the phase, the motor unit 7 is lifted up by an upward pressing load of the spring mechanism 2 and the motor unit 7 collides with the motor bracket 15 and is damaged, so that the damage of the motor unit 7 and motor bracket 15 must be prevented, and the other is that, if the faces of the motor unit 7 and motor bracket 15 make contact with each other after the gears coincide with each other in the phase during rotation, the rotation that must be performed before the bolt joint position comes up becomes impossible, so this must be prevented. In addition, to detect that the end faces of the gear coupling 8 on the motor unit side and the gear coupling 21 on the spool piece side make contact with each other, when the spring mechanism 2 of the motor unit attachment 6 is contracted and the bracket 1 descends, a limit switch 9 installed in the motor unit attachment 6 can detect it. When the limit switch 9 detects the descent of the bracket 1, the ascent of the motor unit 7 is stopped. Further, when the end faces of the gear coupling 8 on the motor unit side and the gear coupling 21 on the spool piece side make contact with each other and the upward pressing load acts on the bracket 1 of the motor unit attachment 6, the upward pressing load can be confirmed by an increase of a measurement value measured by the load meter 10 installed at the lower end of the motor unit attachment 6.

After the end faces of the gear coupling 8 on the motor unit side and the gear coupling 21 on the spool piece side made contact with each other and the ascent of the motor unit 7 was stopped, the motor unit 7 attached to the bolt wrench assembly 11 is rotated (step S5). FIG. 6(c) shows a state that the bolt wrench assembly 11 has been rotated in the state shown in FIG. 6(b) and the motor unit attachment 6 and motor unit 7 have been rotated together. When the upward pressing force by the spring mechanism 2 built in the motor unit attachment 6 is acted on the bracket 1, the bolt wrench assembly 11 rotates the motor unit attachment 6 and motor unit 7. Consequently, between the gear coupling 21 on the spool piece side and the gear coupling 8 on the motor unit side, the gear coupling 8 on the motor unit side rotates relatively. In this rotation, the gear coupling 8 on the motor unit side is rotated by the motor (not shown) installed on the bolt wrench assembly 11 of the fine motion control rod drive mechanism handling apparatus. At this time, in the motor unit 7, the upward pressing force of the spring mechanism 2 built in the motor unit attachment 6 is generated, and the spring force of the spring mechanism 2 built in the motor unit attachment 6 is set so that upward pressing force smaller than the resistance due to the sliding friction during relative rotation will be obtained in the state that the end faces of the gear coupling 8 on the motor unit side and the gear coupling 21 on the spool piece side make contact with each other.

The motor unit 7 is inserted into the motor bracket 15 (step S6). FIG. 6(d) shows a state that the motor unit attachment 6 and motor unit 7 were rotated in the state shown in FIG. 6(c), and the gear coupling 8 on the motor unit side and the gear coupling 21 on the spool piece side coincided with each other in the tip-root phase of the gear, and the bracket 1 and motor unit 7 were pressed up by the upward pressing force of the spring mechanism 2 built in the motor unit attachment 6, and the gear coupling 8 on the motor unit side has been inserted into the gear coupling 21 on the spool piece side, thus the gears of the gear couplings 8 and 21 have meshed with each other. At this time, that the gear coupling 8 on the motor unit side and the gear coupling 21 on the spool piece side have coincided with each other in the tip-root phase of the gear, can be detected by the limit switch 9 installed in the motor unit attachment 6 because the bracket 1 of the motor unit attachment 6 is lifted up by the upward pressing force of the spring mechanism 2. Furthermore, since the value of the load meter 10 installed at the lower end of the motor unit attachment 6 is reduced by the release from the upward pressing force of the spring mechanism 2, it can be confirmed that the gear coupling 8 on the motor unit side and the gear coupling 21 on the spool piece side have coincided with each other in the tip-root phase of the gear. Additionally, as for a rotational angle of the motor unit 7, the motor unit 7 has been ascended in a state that the motor unit 7 has firstly rotated by a specified angle relative to the bolt joint positions to the motor unit 7 and motor bracket 15. When the rotation is finished, the bolt joint positions to the motor unit 7 and motor bracket 15 coincide with each other.

Further, the rotation of the motor unit 7 is started, and after the gear coupling 8 on the motor unit side and the gear coupling 21 on the spool piece side coincide with each other in the tip-root phase of the gear during the rotation and the gear coupling 8 on the motor unit side is inserted into the gear coupling 21 on the spool piece side, the rotation of the motor unit 7 is continued. The motor unit 7 is rotated continuously in the state that the gear coupling 8 on the motor unit side and the gear coupling 21 on the spool piece side are meshing with each other in the gear. The rotation is stopped at the bolt joint position of the motor unit 7 and motor bracket 15.

The bolt wrench assembly 11 is ascended (step S9). FIG. 6(e) shows a state that in the state that as shown in FIG. 6(d), the gear coupling 8 on the motor unit side and the gear coupling 21 on the spool piece side coincide with each other in the tip-root phase of the gear and the gears are meshing with each other, the bolt wrench assembly 11 has been ascended furthermore, and the motor unit 7 and motor bracket 15 are in contact with each other. When ascending the bolt wrench assembly 11, the bolt wrench assembly 11 is pressed up furthermore to confirm that the motor unit 7 come into contact with the motor bracket 15, and the spring mechanism 2 built in the motor unit attachment 6 is further compressed, and the bracket 1 is pressed down. It can be detected that the bracket 1 has come into contact with the motor bracket 15 by the limit switch 9 installed in the motor unit attachment 6. Further, if the motor unit 7 has come into contact with the motor bracket 15, the measurement value of the load meter 10 installed at the lower end of the motor unit attachment 6 also increases. That the motor unit 7 has come into contact with the motor bracket 15 can be simultaneously confirmed by the limit switch 9 and load meter 10. It is confirmed that the motor unit 7 come into contact with the motor bracket 15 based on the position detection and load detection and the ascent of the bolt wrench assembly 11 is stopped. Further, when the bolt wrench assembly 11 ascends and the motor unit 7 is inserted into the motor bracket 15, the motor unit 7 corrects the position shifts in the horizontal direction by the spigot joint of the motor unit 7 and the positioning pin 4 and rotational direction of the motor bracket 15. Thus, the motor unit 7 is positioned.

The motor unit 7 is attached to the motor bracket 15 (step S10), FIG. 6(f) shows the state that after the motor unit 7 and motor bracket 15 are positioned in FIG. 6(d), the bolt wrench 27 installed on the motor unit attachment 6 comes out and tightens the motor unit attaching bolt 17, and the motor unit 7 is attached to the motor bracket 15.

The motor unit attachment 6 is withdrawn from the motor unit 7 (step S11). FIG. 6(g) shows a state that the motor unit 7 is attached to the motor bracket 15, and the attached bolt wrench assembly 11 to which the motor unit attachment 6 was attached has descended, and the motor unit attachment 6 has been pulled out from the motor unit 7. Since the motor unit attachment 6 is withdrawn from the motor unit 7, the bracket 1 of the motor unit attachment 6 is lifted up by the upward pressing force of the spring mechanism 2. It can be confirmed that the motor unit attachment 6 has been withdrawn from the motor unit 7 by the change in the limit switch 9 installed on the motor unit attachment 6 and the reduction in the measurement value of the load meter 10 installed at the lower end of the motor unit attachment 6 after the load of the motor unit 7 is released. After the motor unit attachment 6 was detached from the descended bolt wrench assembly 11, the attaching operation of the motor unit 7 completes.

Figure 8:
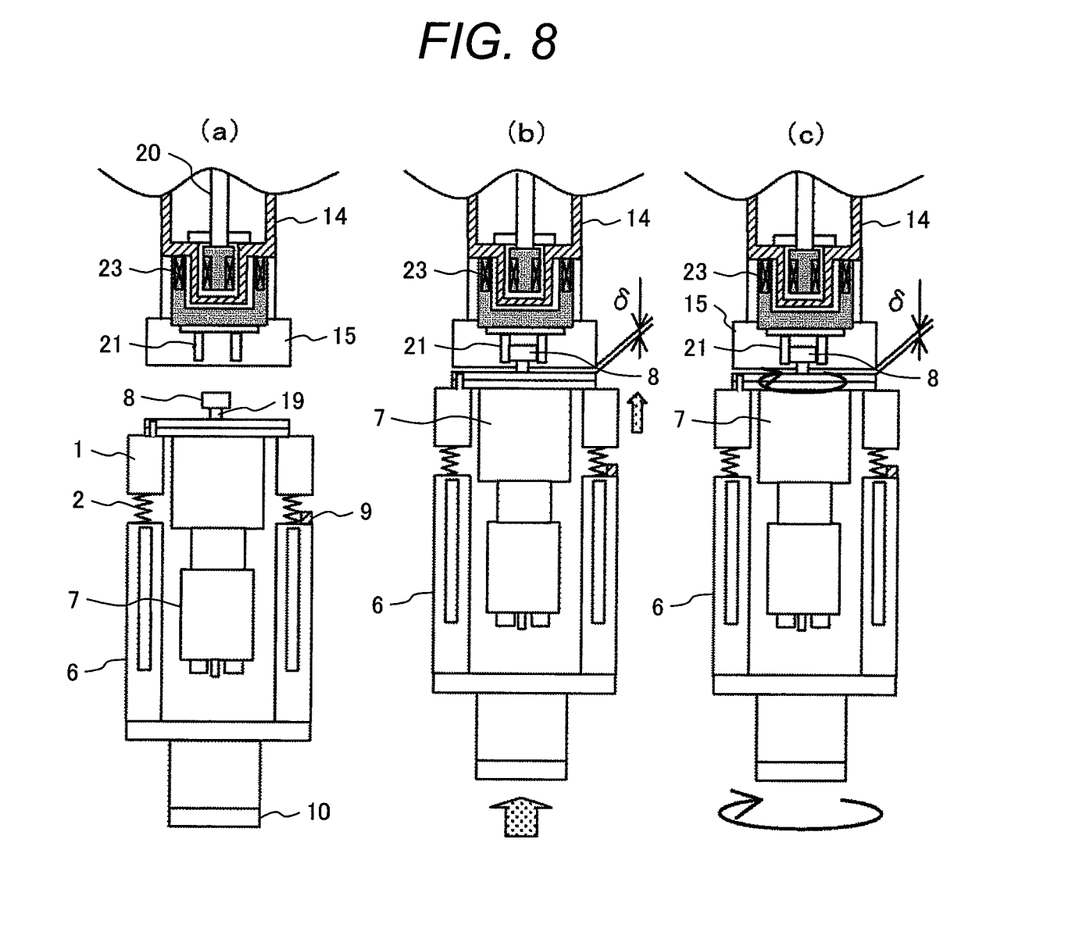
FIG. 8 is an explanatory drawing showing a method for attaching a motor unit in a method of handling a fine motion control rod drive mechanism of embodiment 1 when gears mesh with each other in each operation procedure for attaching the motor unit by using a fine motion control rod drive mechanism handling apparatus.

Next, When the determination of the step S3 shown in FIG. 5 is "YES", that is, in the case that the gear coupling 8 on the motor unit side and the gear coupling 21 on the spool piece side coincide with each other in the tip-root phase of the gear, operation procedure for attaching a motor unit 7 will describe with reference to FIGS. 5 and 8.

Similarly to FIG. 6(a), FIG. 8(a) shows the state where the bolt wrench assembly 11 is ascended with the motor unit 7 put on the motor unit attachment 6.

The motor unit 7 is ascended (step S7). FIG. 8(b) shows a state that the motor unit attachment 6 and the bolt wrench assembly 11 with the motor unit 7 attached to is ascended and, since the gear coupling 8 on the motor unit side and the gear coupling 21 on the spool piece side coincide with each other in the tip-root phase of the gear, the outer teeth of the gear coupling 8 on the motor unit side are inserted into the inner teeth of the gear coupling 21 on the spool piece side and the gears are meshed with each other. Since the gear coupling 8 on the motor unit side and the gear coupling 21 on the spool piece side coincide with each other in the tip-root phase of the gear, the gear coupling 8 on the motor unit side is inserted into the gear coupling 21 by the ascent of the bolt wrench assembly 11, and the bolt wrench assembly 11 ascends up to a specified height. As for the ascending height of the bolt wrench assembly 11, similarly to FIG. 6(b), the movement amount of the bolt wrench assembly 11 is detected by the position detector installed on the bolt wrench assembly 11. When it was detected by the position detector that the bolt wrench assembly 11 has ascended up to the specified height, the bolt wrench assembly is stopped at a preset position. Further, the confirmation of the consistency of the tip-root phase of the gear between the gear coupling 8 on the motor unit side and the gear coupling 21 on the spool piece side can be judged from that the bolt wrench assembly 11 reaches the specified height and the limit switch 9 installed on the motor unit attachment 6 and the load meter 10 installed at the lower end of the motor unit attachment 6 are not changed.

The motor unit 7 is rotated (step S8). FIG. 8(c) shows the state that in FIG. 8(b), that is, in the state that the teeth of the gear coupling 8 on the motor unit side and the gear coupling 21 on the spool piece side have been inserted and the gears are meshing with each other, the bolt wrench assembly 11 is rotated. The rotational angle, similarly to FIG. 6(d), is a set rotational angle. The state in which the operation of the step S8 was finished is in the same state as the state in which the operation of the step S6 was finished. As a consequence, processes for attaching the motor unit to the motor bracket 15 executed after step S8 is the same as the processes of the steps S9-S11. Further, both procedures of the case that the gear coupling 8 on the motor unit side and the gear coupling 21 on the spool piece side do not coincide with each other in the tip-root phase of the gear (the processes of the steps S1-S6 and S9-S11) and the case that the phases coincide with each other (the processes of the steps S1-S3, S7, S8 and S9-S11) are automated before the motor unit 7 is joined to the motor bracket 15 by the attaching bolt 17. Further, it is possible to keep the procedures unautomated, confirm the limit switch operation and change in the load meter by a person at each step, and then go to the next step or to keep the procedures automated, confirm the limit switch operation and change in the load meter by a person at each step, and then go to the next step. In the automation processing, the processes of the steps S1-S11 shown in FIG. 5 are performed by a control apparatus. The control apparatus is a computer having a storage device such as a memory and a hard disk for receiving information from each sensor and recording the received data. The data measured by the sensors and transmitted from the sensors is received by the input/output section of the control apparatus and is subject to the processes of the steps S1-S11 by the CPU of the control apparatus. Each process of the steps S1-S11 is performed by loading and executing the program in the computer.

According to the use of the aforementioned fine motion control rod drive mechanism handling apparatus of the present embodiment, when the gear coupling 8 on the motor unit side and the gear coupling 21 on the spool piece side do not coincide with each other in the tip-root phase of the gear, the readjustment of the rotational position of the gear coupling 8 on the motor unit side is unnecessary and the retry operation is unnecessary. Consequently, a series of attaching operations are simplified and can be automated, and the attaching operability of the motor unit 7 is improved. By doing this, the time of the motor unit attaching operation can be shortened.

Further, the damage of the motor unit 7 at the time of attachment of the motor unit 7 and the damage of the rotation stopping mechanism 22 of the spool piece 14 can be prevented, so that a highly reliable control rod drive mechanism 16 can be provided.

[Embodiment 2]

A fine motion control rod drive mechanism handling apparatus according to embodiment 2, which is another embodiment of the present invention, will be described below with reference to FIG. 9. Assuming the state that the fine motion control rod drive mechanism handling apparatus can only ascend and descend (the rotational mechanism by which the bolt wrench assembly 11 is ascended does not operate or there is an interference article in the periphery, so that it cannot operate), the apparatus can respond to it by only rotating the motor unit 7.

The attaching rotational position of the motor unit 7 when the bolt wrench assembly 11 is ascended in the state that the motor unit attachment 6 is attached to the bolt wrench assembly 11 of the fine motion control rod drive mechanism handling apparatus and the motor unit 7 is put on the motor unit attachment 6, is different from the state shown in FIG. 6(a), and the motor unit attachment 6 and motor unit 7 is ascended at the rotational position which is the bolt joint position to the motor bracket 15. After the ascent of the motor unit 7, if the gear coupling 8 on the motor unit side and the gear coupling 21 on the spool piece side do not coincide with each other in the tip-root phase of the gear, similarly to FIG. 6(b), the bolt wrench assembly 11 with the motor unit attachment 6 and motor unit 7 attached to it is ascended, and the end face of the gear coupling 8 on the motor unit side comes into contact with the end face of the gear coupling 21 on the spool piece side, and the spring mechanism 2 built in the motor unit attachment 6 is compressed, and the state that a pressing load is acted upward by the spring reaction force is kept. Thereafter, similarly to FIG. 6(b), it is detected that the gear coupling 8 on the motor unit side and the gear coupling 21 on the spool piece side have come into contact with each other by the change in the limit switch 9 and the increase in the load meter 10.

Figure 9:
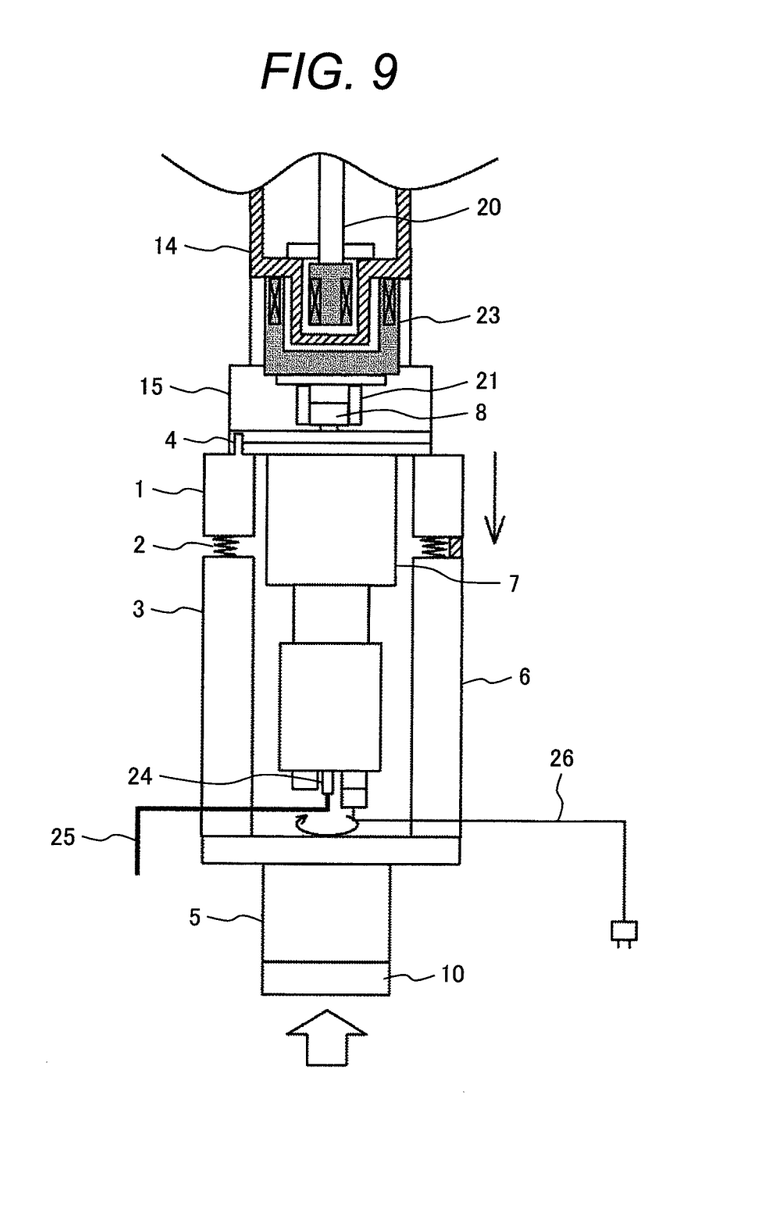
FIG. 9 is a longitudinal sectional view showing a fine motion control rod drive mechanism handling apparatus according to embodiment 2, which is another embodiment of the present invention.

FIG. 9 shows a state that in the state that the end faces of the gear coupling 8 on the motor unit side and the gear coupling 21 on the spool piece side come in contact with each other and the upward pressing force is acted by the reaction force of the spring mechanism 2 built in the motor unit attachment 6, the brake in the motor unit 7 is released by a brake release mechanism 26 and a counter-output shaft 24 of the motor unit 7 is being rotated.

After release of the brake of the motor unit 7, a rotation lever 25 is attached to a counter-output shaft 24 of the motor unit 7 and a rotation lever is rotated. If the rotation lever is rotated, a drive shaft in the motor unit 7 that is connected to the counter-output shaft 24 of the motor unit 7 is rotated and the gear coupling 8 on the motor unit side is also rotated. If the gear coupling 8 on the motor unit side is rotated relatively between the gear coupling 8 on the motor unit side and the gear coupling 21 on the spool piece side, the gear coupling 8 on the motor unit side is inserted into the gear coupling 21 on the spool piece side at the position where the gear coupling 8 on the motor unit side and the gear coupling 21 on the spool piece side coincide with each other in the tip-root phase of the gear. At this time, since the change in the limit switch 9 installed on the motor unit attachment 6 and the reduction in the load meter 10 installed at the lower end of the motor unit attachment 6 are confirmed, it can be confirmed that the gear coupling 8 on the motor unit side and the gear coupling 21 on the spool piece side have coincided with each other in the tip-root phase of the gear and the gear coupling 8 on the motor unit side has been inserted into the gear coupling 21. Furthermore, also after the gear coupling 8 on the motor unit side and the gear coupling 21 on the spool piece side coincide with each other in the tip-root phase of the gear, the rotation lever 25 is rotated at a fixed angle and thereafter, the brake of the motor unit 7 is released by the brake release mechanism 26, and the drive shaft is restrained, and then the rotation lever 25 is detached from the counter-output shaft 24 of the motor unit 7.

After the gear coupling 8 on the motor unit side and the gear coupling 21 on the spool piece side coincide with each other in the phase of the gear, the brake of the motor unit 7 is released, and the drive shaft is restrained, the processes of the steps S9-S11 are executed. That is, the bolt wrench assembly 11 is ascended, and the motor unit 7 and motor bracket 15 are permitted to come into contact with each other. Additionally, the bolt wrench 27 installed on the motor unit attachment 6 comes out and tightens the motor unit attaching bolt. Thus, the motor unit 7 is attached to the motor bracket 15. After that, the bolt wrench assembly 11 with the motor unit attachment 6 attached to it is descended, and the motor unit attachment 6 is withdrawn from the motor unit 7.

[Embodiment 3]

A fine motion control rod drive mechanism handling apparatus according to embodiment 3, which is another embodiment of the present invention, will be described below with reference to FIG. 10.

Figure 10:
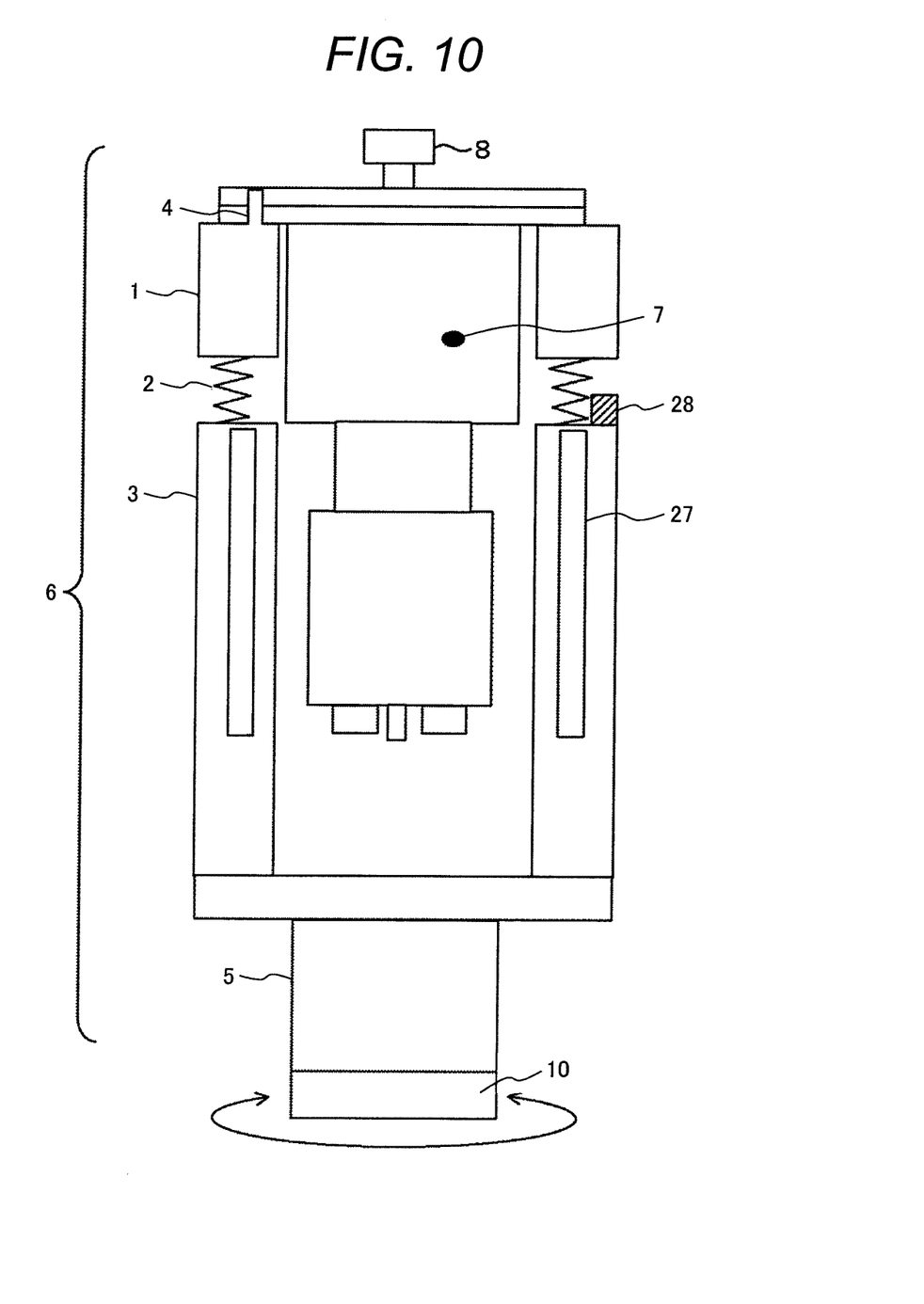
FIG. 10 is a longitudinal sectional view showing a fine motion control rod drive mechanism handling apparatus according to embodiment 3, which is another embodiment of the present invention.

The procedure for attaching the motor unit 7 is the same as the procedure of embodiment 1 shown in FIG. 5, though FIG. 10 shows a state that using a displacement meter 28 installed on the motor unit attachment 6 instead of the limit switch 9, the distance between the bracket 1 of the motor unit attachment 6 and the casing 3 can be measured. The displacement meter 28 may be either the contact type or the non-contact type. The movement amount of the bracket 1 is measured by the displacement meter 28, thus the contract amount of the spring mechanism 2 installed on the motor unit attachment 6 can be confirmed. Further, the attaching procedure of the motor unit 7 is the same as that of the embodiment 1, so it will be omitted. The method for detaching the motor unit 7 from the motor bracket 15 is also the same as that of embodiment 1, so it will be omitted.

As mentioned above, the correct contract amount of the spring mechanism 2 can be seen by a numerical value by using the displacement meter 28. In Embodiment 1, the last moved position can be determined as approval or disapproval, and if the displacement amount is furthermore found by the displacement meter 28, the ascending distance can be judged accurately. As mentioned above, in the fine motion control rod drive mechanism handling apparatus using for attaching or detaching the fine motion control rod drive mechanism having the four kinds of components of a control rod drive mechanism body 13, spool piece 14, motor bracket 15, and motor unit 7 to or from the reactor pressure vessel 100, by the fine motion control rod drive mechanism handling apparatus having the motor unit attachment 6 for meshing the gear coupling 21 on the spool piece side with the gear coupling 8 on the motor unit side in the gear, the motor unit attaching operability is improved and the attaching operation time can be shortened.

As mentioned above, even when the gear coupling 21 on the spool piece side and the gear coupling 8 on the motor unit side do not mesh with each other in the gear, since the gear couplings can be immediately meshed with each other by the fine motion control rod drive mechanism handling apparatus including the bolt wrench assembly 11 ascending and descending on the motor unit 7 and the rotational mechanism for rotating the motor unit attachment 6, the motor unit attaching operability is improved and the attaching operation time can be shortened. Further, the above rotational mechanism is provided with the rotational mechanism installed in the bolt wrench assembly 11 used in embodiment 1, and the rotational mechanism used in embodiment 2 and having the brake release mechanism 26 for releasing the brake of the motor unit 7 when the gear coupling 21 on the spool piece side and the gear coupling 8 on the motor unit side do not coincide with each other in the gears by the motor unit attachment 6, and the counter-output shaft 24 for rotating the gear coupling 8 of the motor unit side.

As mentioned above, since the fine motion control rod drive mechanism handling apparatus has the load detection function (example, the load meter 10) or the position detection function (for example, the limit switch 9) for detecting the gear meshing state of the gear coupling 21 on the spool piece side and the gear coupling 8 on the motor unit side, it can be confirmed easily that the gears are meshing with each other.

As mentioned above, the motor unit attachment has the function (for example, the spring mechanism 2) for releasing the pressing force of the motor unit 7 when the gear coupling 21 on the spool piece side does not mesh with the gear coupling 8 on the motor unit side in the gear, so that the gears and the like can be prevented from application of a large load.

As mentioned above, the motor unit attachment 7 can perform a more precise attaching operation by the fine motion control rod drive mechanism handling apparatus having the function for detecting the tip-root position of the gear of the gear coupling 21 on the spool piece side and the gear coupling 8 on the motor unit side and executing phase fitting for the gears of the gear couplings.

As mentioned above, since the motor unit attachment 6 has the function for positioning the motor unit in the rotational direction, it attaches the motor unit 7 in accordance with the positioning pin 4 of the motor unit attachment 6 in the rotational direction to prevent the position of the motor unit 7 in the rotational direction from changing. Thus the motor unit attaching operability can be improved and the attaching operation time can be shortened.

As mentioned above, the method of handling the fine motion control rod drive mechanism ascends the motor unit 7 to press each other in the gears, and in the pressed state, rotates the gear of the gear coupling 8 on the motor unit side when the gear coupling 21 on the spool piece side and gear coupling 8 on the motor unit side of the fine motion control rod drive mechanism do not mesh with each other in the gear. Accordingly, the motor unit attaching operability can be improved and the attaching operation time can be shortened.

As mentioned above, when pressing each in the gears, a motor unit attachment 6 having an elastic mechanism is used to press the gears, thus the gears can be prevented from application of a large load.

[Reference Signs List]

1: bracket, 2: spring mechanism, 3: casing, 4: positioning pin, 5: shaft, 6: motor unit attachment, 7: motor unit, 8, 21: magnet coupling, 9: limit switch, 10: load meter, 11: bolt wrench assembly, 12: control rod drive mechanism housing, 13: control rod drive mechanism body, 14: spool piece, 15:

motor bracket, 16: fine motion control rod drive mechanism, 17: attaching bolt, 18: control rod, 19, 20: rotary shaft, 22: rotation stopping mechanism, 23: magnet coupling, 24: counter-output shaft, 25: rotation lever, 26: brake release mechanism, 27: bolt wrench, 28: displacement meter, 100: reactor pressure vessel.

What is claimed is:

1. A fine motion control rod drive mechanism handling apparatus configured to attach a motor unit to, and detach the motor unit from, a motor bracket of a fine motion control rod drive mechanism, the fine motion control rod drive mechanism provided with a control rod drive mechanism body, a spool piece, and the motor bracket, the fine motion control rod drive mechanism handling apparatus comprising:
    a motor unit attachment, configured to support the motor unit, to ascend the motor unit towards the spool piece, to descend the motor unit away from the spool piece, and to generate a force pressing the motor unit against the spool piece when a gear of a gear coupling of the motor unit is in contact with a gear of a gear coupling of the spool piece;
    a bolt wrench assembly configured to ascend and descend the motor unit; and
    a rotational mechanism configured to rotate the gear of the gear coupling of the motor unit;
    wherein the motor unit attachment includes a release mechanism configured to release the force pressing the motor unit against the spool piece, when the gear of the gear coupling of the motor unit and the gear of the gear coupling of the spool piece are in contact but do not mesh with each other;
    wherein the bolt wrench assembly includes the rotational mechanism.

2. A fine motion control rod drive mechanism handling apparatus according to claim 1, further comprising:
    at least one of a load detection apparatus, and a position detection apparatus, configured to detect a gear meshing state of the gear of the gear coupling of the motor unit and the gear of the gear coupling of the spool piece.

3. A fine motion control rod drive mechanism handling apparatus according to claim 1, wherein the motor unit attachment is configured to detect a tip-root position of the respective gears of the gear coupling of the motor unit and the gear coupling of the spool piece, and to fit a phase of the gear coupling of the spool piece to a phase of the gear coupling of the motor unit.

4. A fine motion control rod drive mechanism handling apparatus according to claim 1, wherein the motor unit attachment is configured to position the motor unit in a rotational direction.

5. A fine motion control rod drive mechanism handling apparatus configured to attach a motor unit to, and detach the motor unit from, a motor bracket of a fine motion control rod drive mechanism, the fine motion control rod drive mechanism provided with a control rod drive mechanism body, a spool piece, and the motor bracket, the fine motion control rod drive mechanism handling apparatus comprising:
    a motor unit attachment, configured to support the motor unit, to ascend the motor unit towards the spool piece, to descend the motor unit away from the spool piece, and to generate a force pressing the motor unit against the spool piece when a gear of a gear coupling of the motor unit is in contact with a gear of a gear coupling of the spool piece;
    a bolt wrench assembly configured to ascend and descend the motor unit; and
    a rotational mechanism configured to rotate the gear of the gear coupling of the motor unit;
    wherein the motor unit attachment includes a release mechanism configured to release the force pressing the motor unit against the spool piece, when the gear of the gear coupling of the motor unit and the gear of the gear coupling of the spool piece are in contact but do not mesh with each other; and
    wherein the motor unit attachment includes a brake release mechanism configured to release a brake of the motor unit, and a counter-output shaft configured to rotate the gear coupling of the spool piece.

* * * * *